United States Patent
Tsuji

(10) Patent No.: US 10,168,764 B2
(45) Date of Patent: Jan. 1, 2019

(54) ELECTRONIC DEVICE THAT ENSURES REDUCED POWER CONSUMPTION AND HIGH SPEED SWITCHING OF POWER MODES AND RECORDING MEDIUM

(71) Applicant: KYOCERA Document Solutions Inc., Osaka (JP)

(72) Inventor: Shuntaro Tsuji, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 47 days.

(21) Appl. No.: 15/371,898

(22) Filed: Dec. 7, 2016

(65) Prior Publication Data
US 2017/0212580 A1    Jul. 27, 2017

(30) Foreign Application Priority Data

Jan. 27, 2016  (JP) .................................. 2016-013076
Jan. 27, 2016  (JP) .................................. 2016-013077

(51) Int. Cl.
    *G06F 1/32*        (2006.01)
    *G06F 13/42*       (2006.01)
    *G06F 13/38*       (2006.01)

(52) U.S. Cl.
    CPC .......... *G06F 1/3287* (2013.01); *G06F 1/3203* (2013.01); *G06F 1/3215* (2013.01);
    (Continued)

(58) Field of Classification Search
    CPC ........ G06F 1/3202; G06F 1/3231; G06F 1/26; G06F 1/206; G06F 1/3228; G06F 1/08;
    (Continued)

(56) References Cited

U.S. PATENT DOCUMENTS 7,647,513 B2 *  1/2010  Tobias .................. G06F 1/3203
                                              713/300
7,971,086 B2 *  6/2011  Itkin ..................... G06F 1/3203
                                              713/330
(Continued)

FOREIGN PATENT DOCUMENTS

CN       101815145 A    8/2010
JP       2002-175168 A  6/2002
(Continued)

OTHER PUBLICATIONS

Office Action dated Apr. 24, 2018, issued to Japanese Application No. 2016-013076.
(Continued)

*Primary Examiner* — Zahid Choudhury
(74) *Attorney, Agent, or Firm* — Stein IP, LLC

(57) ABSTRACT

An electronic device has a normal mode, a weak power-saving mode, a strong power-saving mode, and a power-saving temporary mode. The power-saving temporary mode is temporarily switched every time a specific timing arrives while a specific condition is unsatisfied in the strong power-saving mode. The power-saving temporary mode reduces power consumption of at least a part of the hardware element in the power-saving temporary mode compared with the power consumption in the weak power-saving mode. The strong power-saving mode reduces power consumption of at least a part of the hardware element in the strong power-saving mode compared with the power consumption in the power-saving temporary mode. The power mode switching unit switches to the weak power-saving mode when the specific condition becomes satisfied in the strong power-saving mode.

7 Claims, 10 Drawing Sheets

(52) U.S. Cl.
CPC .......... *G06F 1/3243* (2013.01); *G06F 1/3253* (2013.01); *G06F 1/3275* (2013.01); *G06F 1/3293* (2013.01); *G06F 13/385* (2013.01); *G06F 13/4282* (2013.01); *Y02D 10/14* (2018.01); *Y02D 10/151* (2018.01)

(58) Field of Classification Search
CPC ....... G06F 1/3289; G06F 1/266; H04L 12/12; H04L 12/10
See application file for complete search history.

(56) References Cited

U.S. PATENT DOCUMENTS

| | | | |
|---|---|---|---|
| 2005/0182976 A1* | 8/2005 | Berkes | G06F 1/3203 713/300 |
| 2010/0214593 A1 | 8/2010 | Toda | 358/1.14 |
| 2012/0198259 A1 | 8/2012 | Suzuki | 713/323 |
| 2014/0355052 A1 | 12/2014 | Mikashima | 358/1.15 |
| 2015/0347117 A1 | 12/2015 | Tokunaga et al. | |

FOREIGN PATENT DOCUMENTS

| | | |
|---|---|---|
| JP | 2006-242981 A | 9/2006 |
| JP | 2012-158078 A | 8/2012 |
| JP | 2013-165525 A | 8/2013 |
| JP | 2014-68137 A | 4/2014 |
| JP | 2014-231175 A | 12/2014 |
| JP | 2015-126662 A | 7/2015 |
| JP | 2015-152846 A | 8/2015 |
| JP | 2015-225655 A | 12/2015 |

OTHER PUBLICATIONS

Chinese Office Action dated Aug. 27, 2018, issued to Chinese Application No. 201710006002.5.
Japanese Office Action dated Sep. 12, 2018, issued by the Japanese Patent Office in corresponding application JP 2016-013077.

* cited by examiner

ELECTRONIC DEVICE THAT ENSURES REDUCED POWER CONSUMPTION AND HIGH SPEED SWITCHING OF POWER MODES AND RECORDING MEDIUM

INCORPORATION BY REFERENCE

This application is based upon, and claims the benefit of priority from, corresponding Japanese Patent Application Nos. 2016-013076 and 2016-013077, each filed in the Japan Patent Office on Jan. 27, 2016, the entire contents of which are incorporated herein by reference.

BACKGROUND

Unless otherwise indicated herein, the description in this section is not prior art to the claims in this application and is not admitted to be prior art by inclusion in this section.

There is a typical electronic device configured to switch to a normal mode and a power-saving mode, whose power consumption is lower than that of the normal mode, to intermittently repeat temporary increase of power consumption (of, for example, a specific device) in the power-saving mode.

SUMMARY

An electronic device according to an aspect of the disclosure includes a hardware element that includes a power mode switching unit that switches power modes of the electronic device. The power mode includes a normal mode, a weak power-saving mode, a strong power-saving mode, and a power-saving temporary mode. The weak power-saving mode has a power consumption lower than a power consumption of the normal mode. The strong power-saving mode has a power consumption is lower than the power consumption of the weak power-saving mode. The power-saving temporary mode is temporarily switched every time a specific timing arrives while a specific condition is unsatisfied in the strong power-saving mode. The power-saving temporary mode has a power consumption lower than the power consumption of the weak power-saving mode due to a reduced power consumption of at least a part of the hardware element in the power-saving temporary mode compared with the power consumption in the weak power-saving mode. The power consumption of the strong power-saving mode is lower than the power consumption of the power-saving temporary mode due to a reduced power consumption of at least a part of the hardware element in the strong power-saving mode compared with the power consumption in the power-saving temporary mode. The power mode switching unit switches to the weak power-saving mode when the specific condition becomes satisfied in the strong power-saving mode.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
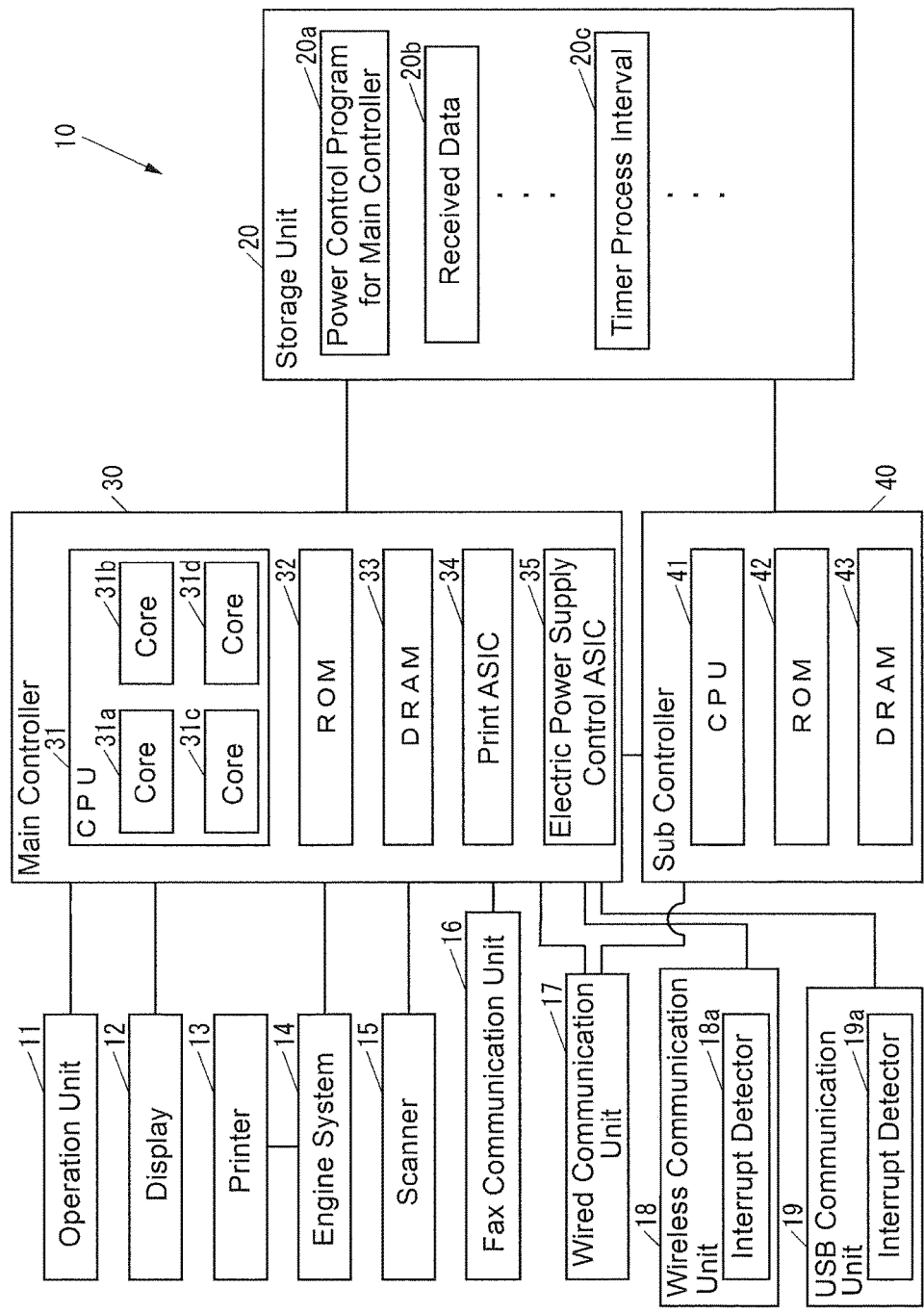
FIG. 1 illustrates an MFP according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure by referring to the drawings.

First, a description will be given of a configuration of a Multifunction Peripheral (MFP) as an electronic device according to the embodiment.

FIG. 1 illustrates an MFP 10 according to the embodiment.

As illustrated in FIG. 1, the MFP 10 includes an operation unit 11, a display 12, a printer 13, an engine system 14, a scanner 15, a fax communication unit 16, a wired communication unit 17, a wireless communication unit 18, a USB communication unit 19, a storage unit 20, a main controller 30, and a sub controller 40. The operation unit 11 is an input device such as a button where various operations are input. The display 12 is a display device such as a Liquid Crystal Display (LCD) that displays various information. The printer 13 is a print device that prints on a recording medium such as a paper sheet. The engine system 14 is a device that operates the printer 13. The scanner 15 is a reading device reads an image from a document. The fax communication unit 16 is a fax device that executes fax communication via a communication line such as a dial-up line with an external facsimile device (not illustrated). The wired communication unit 17 is a network communication device that communicates with an external device by wire via a network such as a Local Area Network (LAN). The wireless communication unit 18 is a network communication device that communicates with an external device via the LAN by wireless communication such as Wi-Fi. The USB communication unit 19 is a USB communication device that includes a USB connector (not illustrated) for connecting to a Universal Serial Bus (USB) device. The storage unit 20 is a nonvolatile storage device, such as a semiconductor memory and a Hard Disk Drive (HDD), that stores various information. The main controller 30 is a device that can execute a process according to received data of all protocols that the MFP 10 supports. The sub controller 40 is a device that can execute a process according to received data of only a part of the protocols among all the protocols that the MFP 10 supports.

The wireless communication unit 18 configures a wireless response device that responds to a specific input via the wireless communication. The wireless communication unit 18 includes an interrupt detector 18a that detects an interrupt by occurrence of the specific input via the wireless communication. If the wireless communication unit 18 does not appropriately respond when the specific input via the wireless communication occurs, an external wireless device connected via the wireless communication recognizes that connection to the MFP 10 has been lost.

The USB communication unit 19 configures a USB response device that responds to a specific input via a USB. The USB communication unit 19 includes an interrupt detector 19a that detects an interrupt by occurrence of the specific input via the USB. If the USB communication unit 19 does not appropriately respond when the specific input via the USB occurs, an external USB device connected via the USB recognizes that connection to the MFP 10 has been lost.

The storage unit 20 stores a power control program 20a for controlling electric power of the MFP 10. The power control program 20a may be installed on the MFP 10 at production stage of the MFP 10, may be additionally installed on the MFP 10 from an external storage medium such as a SD card and a USB flash drive, or may be additionally installed on the MFP 10 via the network.

The storage unit 20 can store a plurality of pieces of received data 20b by the wired communication unit 17, the wireless communication unit 18, and the USB communication unit 19.

The storage unit 20 can store a timer process interval 20c indicating a time interval of timer process (described below) for each kind of the timer processes.

The main controller 30, for example, includes a Central Processing Unit (CPU) 31, a Read Only Memory (ROM) 32, a Dynamic Random Access Memory (DRAM) 33, a print Application Specific Integrated Circuit (ASIC) 34, and an electric power supply control ASIC 35. The ROM 32 stores programs and various data. The DRAM 33 is used as a work area of the CPU 31. The print ASIC 34 executes operation such as drawing of the image printed by the printer 13. The electric power supply control ASIC 35 controls supply of the electric power to the CPU 31, the ROM 32, and the DRAM 33. The CPU 31 executes the programs stored in the storage unit 20 or the ROM 32.

The CPU 31 is a quad-core CPU that mounts a core 31a, a core 31b, a core 31c, and a core 31d. However, the disclosure is also applicable to a configuration that employs a single-core CPU.

The sub controller 40, for example, includes a CPU 41, a ROM 42, and a DRAM 43. The ROM 42 stores programs and various data. The DRAM 43 is used as a work area of the CPU 41. The CPU 41 executes the programs stored in the storage unit 20 or the ROM 42.

The main controller 30 can execute the process according to received data of the protocols that are not supported by the sub controller 40. For example, the main controller 30 can execute a printing process by the printer 13 according to received data of a protocol for printing such as a Line PRinter daemon protocol (LPR) and a Raw protocol. However, the sub controller 40 cannot execute the printing process by the printer 13 according to the received data of the protocol for printing.

The main controller 30 can request lease period update of an Internet Protocol (IP) address of the MFP 10 as a Dynamic Host Configuration Protocol (DHCP) client from a DHCP server before an expiration timing of the lease period has arrived. On the other hand, the sub controller 40 cannot update the lease period of the IP address of the MFP 10.

The main controller 30 can transmit a report mail as an e-mail for notifying various states at the MFP 10 in every time interval indicated by the timer process interval 20c, for example, per minute. The various states, for example, include a remaining amount of toner and a value of a print counter at the printer 13. On the other hand, the sub controller 40 cannot transmit the report mail.

The sub controller 40 can execute a process according to received data of a protocol frequency transmitted and received in the network, such as an Address Resolution Protocol (ARP).

As described above, the number of kind of processes that the sub controller 40 can execute is smaller than that of the main controller 30. Accordingly, performance of the sub controller 40 may be lower than that of the main controller 30. For example, processing capacity of the CPU 41 of the sub controller 40 may be lower than that of the CPU 31 of the main controller 30. Storage capacity of the DRAM 43 of the sub controller 40 may be lower than that of the DRAM 33 of the main controller 30. When the performance of the sub controller 40 is lower than the performance of the main controller 30, electric power consumed by the sub controller 40 is lower than electric power consumed by the main controller 30.

The main controller 30 is connected to the operation unit 11, the display 12, the engine system 14, the scanner 15, the fax communication unit 16, the wired communication unit 17, the wireless communication unit 18, the USB communication unit 19, the storage unit 20, and the sub controller 40.

The sub controller 40 is connected to the wired communication unit 17, the storage unit 20, and the main controller 30.

Figure 2:
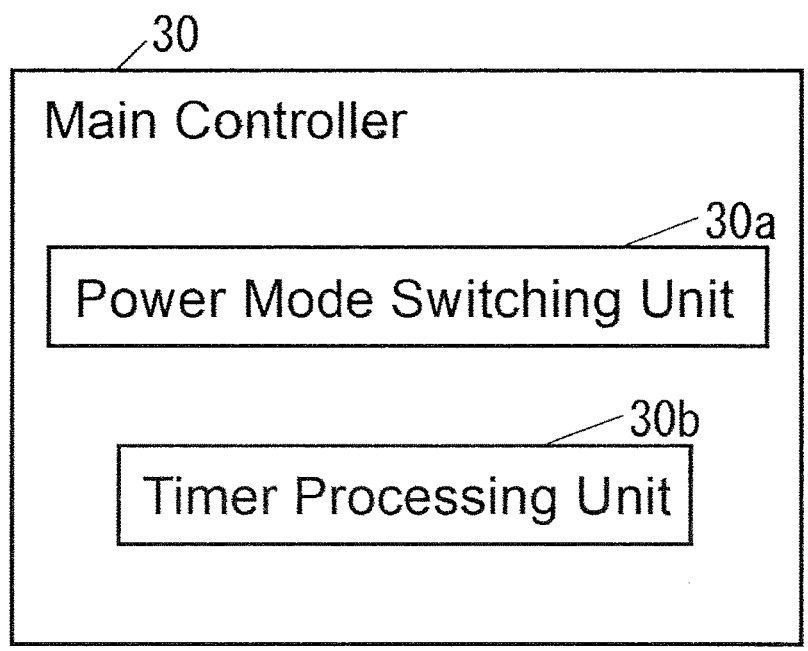
FIG. 2 illustrates a function of a main controller according to the embodiment.

FIG. 2 illustrates a function of the main controller 30.

As illustrated in FIG. 2, the CPU 31 (See FIG. 1) of the main controller 30 executes the power control program 20a (See FIG. 1) stored in the storage unit 20 (See FIG. 1) to function as a power mode switching unit 30a and a timer processing unit 30b. The power mode switching unit 30a switches power modes of the MFP 10. The timer processing unit 30b intermittently repeats a specific process (hereinafter referred to as "the timer process") by the main controller 30 itself according to time.

Here, the timer process includes the above-described lease period update of the IP address of the MFP 10 and the above-described transmission of the report mail. A time interval of the repeat of the timer process can be set by an administrator of the MFP 10.

Figure 3:
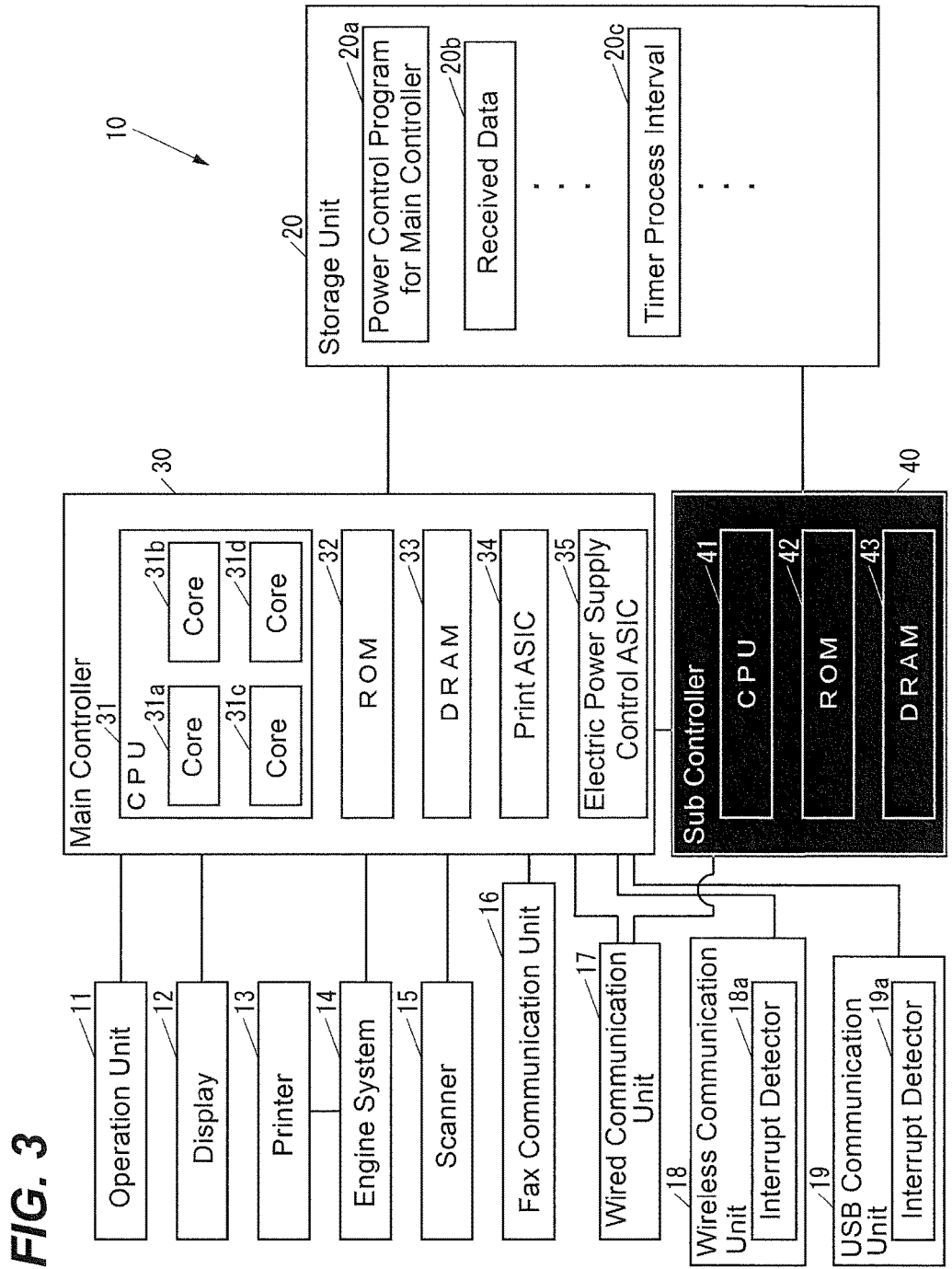
FIG. 3 illustrates the MFP according to the embodiment in a normal mode.

FIG. 3 illustrates the MFP 10 in a normal mode.

In FIG. 3, devices where the supply of the electric power is halted are illustrated with black-and-white inversion. That is, in FIG. 3, the supply of the electric power to the sub controller 40 is halted. Among components of the MFP 10 illustrated in FIG. 3, the electric power is supplied to the components except for the sub controller 40.

As described above, when the electric power consumed by the sub controller 40 is lower than the electric power consumed by the main controller 30, it is considered that the electric power consumed by the sub controller 40 is modest even if the electric power is supplied to the sub controller 40. Accordingly, the electric power may be supplied to the sub controller 40 in the normal mode. In a case of a configuration where the sub controller 40, not the main controller 30, executes, even in the normal mode, the process executable by the sub controller 40 among the processes according to the received data by the wired communication unit 17, it is necessary to supply the electric power to the sub controller 40 in the normal mode. Also in a case of a configuration where the main controller 30 receives the received data by at least one of the fax communication unit 16, the wired communication unit 17, the wireless communication unit 18, and the USB communication unit 19 via the sub controller 40, it is necessary to supply the electric power to the sub controller 40 in the normal mode.

Figure 4:
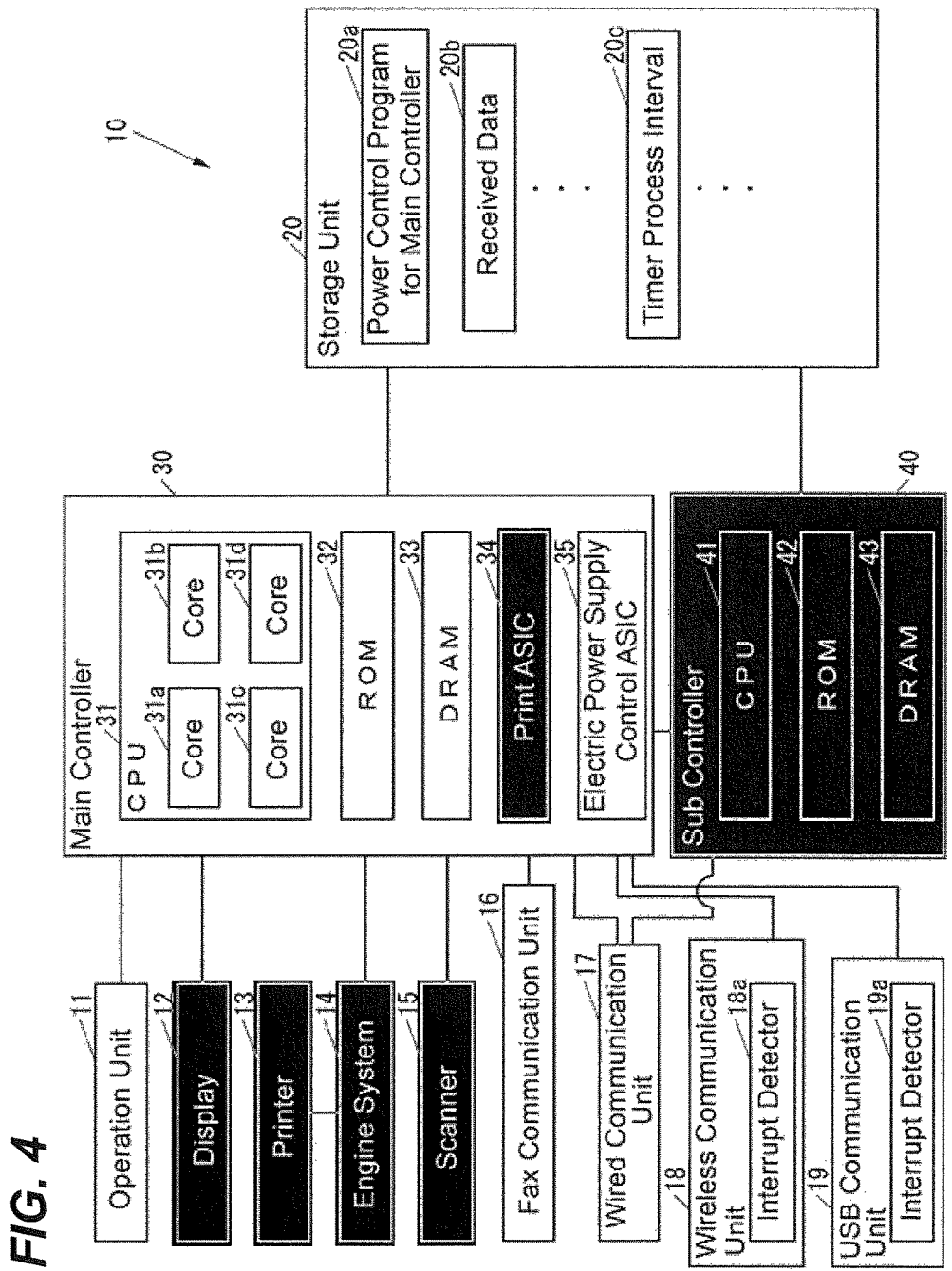
FIG. 4 illustrates the MFP according to the embodiment in a weak power-saving mode.

FIG. 4 illustrates the MFP 10 in a weak power-saving mode, whose power consumption is lower than that of the normal mode.

In FIG. 4, devices where the supply of the electric power is halted are illustrated with black-and-white inversion. That is, compared with the normal mode illustrated in FIG. 3, the supply of the electric power to the display 12, the printer 13, the engine system 14, the scanner 15, and the print ASIC 34 of the main controller 30 is halted in FIG. 4. Also in FIG. 4, similar to the normal mode illustrated in FIG. 3, the supply of the electric power to the sub controller 40 is halted.

In the weak power-saving mode, similar to the normal mode, the electric power may be supplied to the sub controller 40.

Figure 5:
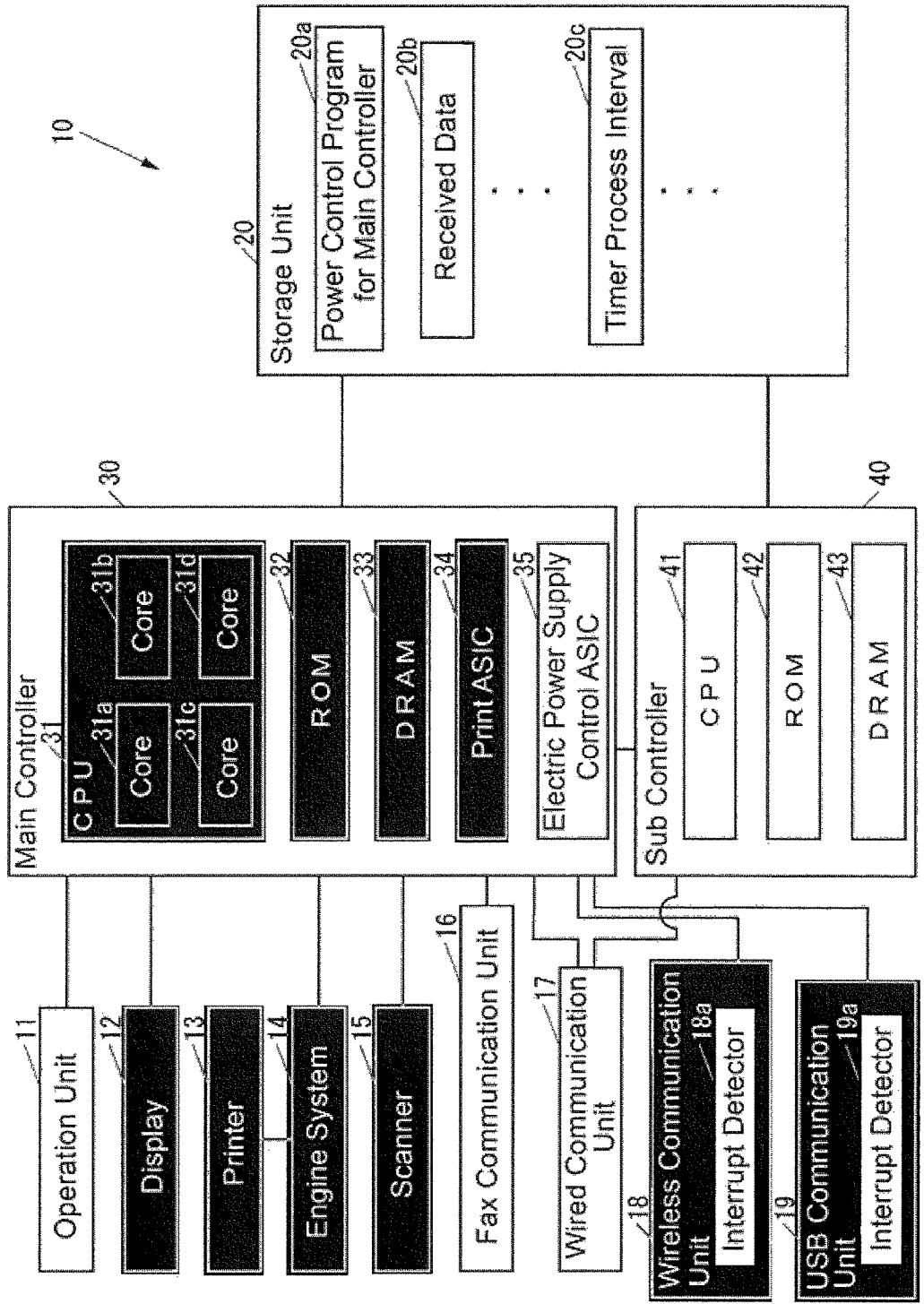
FIG. 5 illustrates the MFP according to the embodiment in a strong power-saving mode.

FIG. 5 illustrates the MFP 10 in a strong power-saving mode, whose power consumption is lower than that of the weak power-saving mode.

In FIG. 5, devices where the supply of the electric power is halted are illustrated with black-and-white inversion. That is, compared with the normal mode illustrated in FIG. 3, the supply of the electric power to the display 12, the printer 13, the engine system 14, the scanner 15, the wireless communication unit 18 (however, except for the interrupt detector 18a), the USB communication unit 19 (however, except for the interrupt detector 19a), and the CPU 31 (in detail, all the cores 31a to 31d of the CPU 31), the ROM 32, the DRAM 33, and the print ASIC 34 of the main controller 30 is halted, and the electric power is supplied to the sub controller 40, in FIG. 5.

In the strong power-saving mode, the supply of the electric power to the DRAM 33 is not completely halted. The DRAM 33 operates in a self-refresh mode, whose power consumption is lower than that of the normal mode, to keep on holding data.

The strong power-saving mode ensures the reduced power consumption of the USB communication unit 19 compared with the weak power-saving mode since the supply of the electric power to the USB communication unit 19 (however, except for the interrupt detector 19a) is halted as described above. However, in the strong power-saving mode, the USB communication unit 19 cannot respond to the specific input that the USB communication unit 19 can respond in the weak power-saving mode since the supply of the electric power to the USB communication unit 19 (however, except for the interrupt detector 19a) is halted.

Similarly, the strong power-saving mode ensures the reduced power consumption of the wireless communication unit 18 compared with the weak power-saving mode since the supply of the electric power to the wireless communication unit 18 (however, except for the interrupt detector 18a) is halted as described above. However, in the strong power-saving mode, the wireless communication unit 18 cannot respond to the specific input that the wireless communication unit 18 can respond in the weak power-saving mode since the supply of the electric power to the wireless communication unit 18 (however, except for the interrupt detector 18a) is halted.

Figure 6:
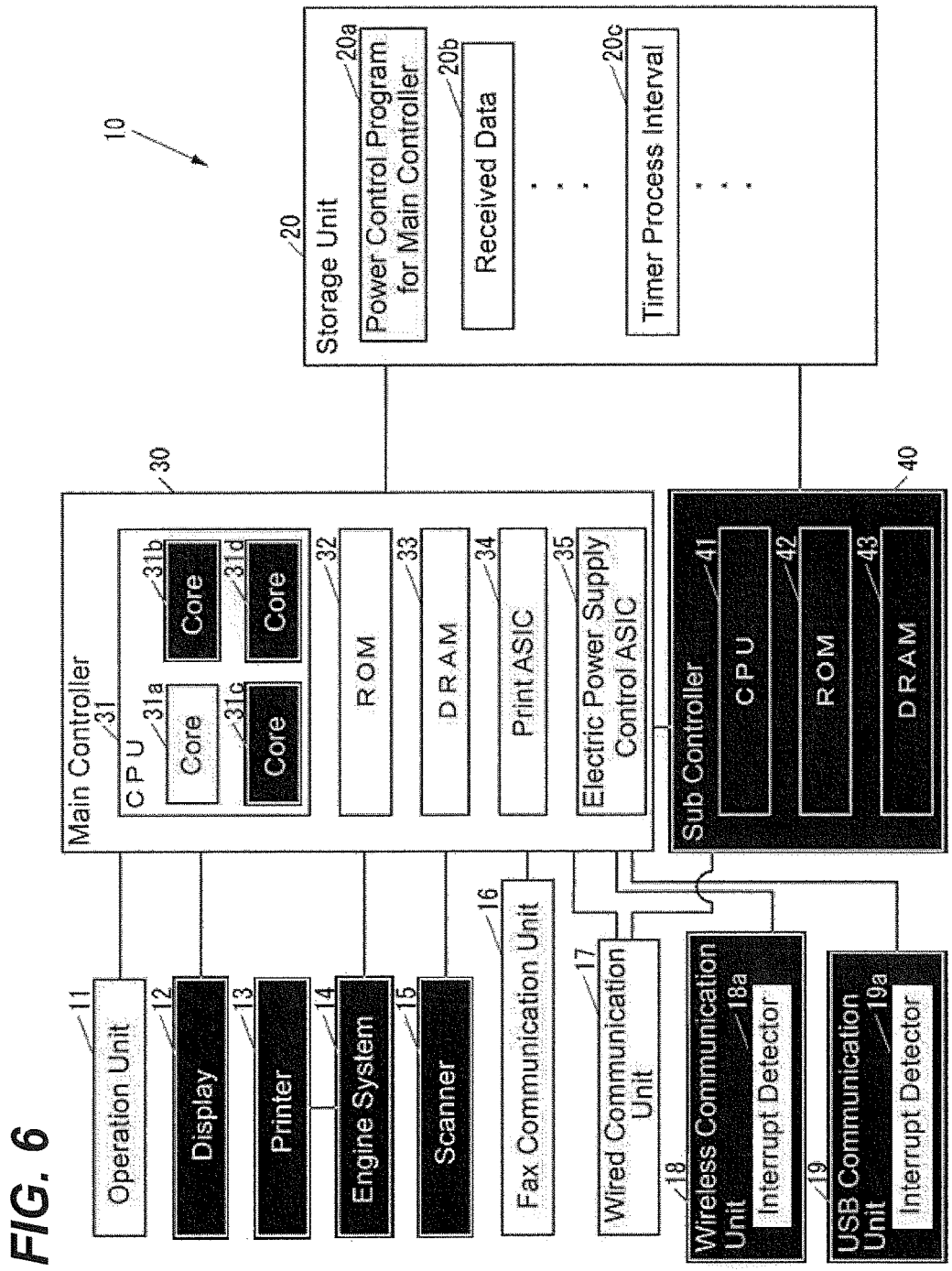
FIG. 6 illustrates the MFP according to the embodiment in a power-saving temporary mode.

FIG. 6 illustrates the MFP 10 in a power-saving temporary mode that is temporarily switched every time a specific timing arrives while a specific condition is not satisfied in the strong power-saving mode.

In FIG. 6, devices where the supply of the electric power is halted are illustrated with black-and-white inversion. That is, compared with the normal mode illustrated in FIG. 3, the supply of the electric power to the display 12, the printer 13, the engine system 14, the scanner 15, the wireless communication unit 18 (however, except for the interrupt detector 18a), the USB communication unit 19 (however, except for the interrupt detector 19a), and the cores 31b to 31d of the CPU 31 and the print ASIC 34 of the main controller 30 is halted in FIG. 6. Also in FIG. 6, similar to the normal mode illustrated in FIG. 3, the supply of the electric power to the sub controller 40 is halted.

The power consumption of the power-saving temporary mode is lower than that of the weak power-saving mode since the electric power is not supplied to the wireless communication unit 18 (however, except for the interrupt detector 18a), the USB communication unit 19 (however, except for the interrupt detector 19a), and the cores 31b to 31d of the CPU 31, where the electric power is supplied in the weak power-saving mode. The power consumption of the power-saving temporary mode is larger than that of the strong power-saving mode since the electric power is supplied to the core 31a of the CPU 31, the ROM 32, and the DRAM 33, where the electric power is not supplied in the strong power-saving mode.

In the power-saving temporary mode, similar to the normal mode, the electric power may be supplied to the sub controller 40.

The power-saving temporary mode ensures the reduced power consumption of the USB communication unit 19 compared with the weak power-saving mode since the supply of the electric power to the USB communication unit 19 (however, except for the interrupt detector 19a) is halted as described above. However, in the power-saving temporary mode, the USB communication unit 19 cannot respond to the specific input that the USB communication unit 19 can respond in the weak power-saving mode since the supply of the electric power to the USB communication unit 19 (however, except for the interrupt detector 19a) is halted.

Similarly, the power-saving temporary mode ensures the reduced power consumption of the wireless communication unit 18 compared with the weak power-saving mode since the supply of the electric power to the wireless communication unit 18 (however, except for the interrupt detector 18a) is halted as described above. However, in the power-saving temporary mode, the wireless communication unit 18 cannot respond to the specific input that the wireless communication unit 18 can respond in the weak power-saving mode since the supply of the electric power to the wireless communication unit 18 (however, except for the interrupt detector 18a) is halted.

The following describes an operation of the MFP 10.

Figure 7:
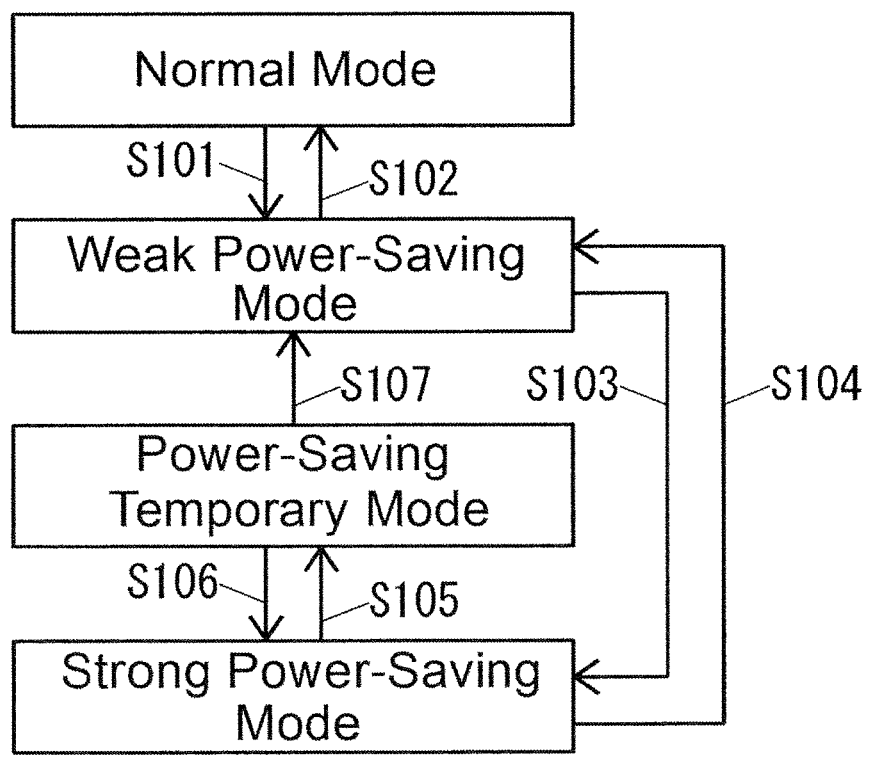
FIG. 7 illustrates transition of a power mode of the MFP according to the embodiment.

FIG. 7 illustrates transition of the power mode of the MFP 10.

As illustrated in FIG. 7, the MFP 10 can switch from the normal mode to the weak power-saving mode (Step S101), and conversely, can switch from the weak power-saving mode to the normal mode (Step S102).

The MFP 10 can switch from the weak power-saving mode to the strong power-saving mode (Step S103), and conversely, can switch from the strong power-saving mode to the weak power-saving mode (Step S104).

The MFP 10 can switch from the strong power-saving mode to the power-saving temporary mode (Step S105), and conversely, can switch from the power-saving temporary mode to the strong power-saving mode (Step S106).

The MFP 10 can switch from the power-saving temporary mode to the weak power-saving mode (Step S107). However, the MFP 10 cannot switch from the weak power-saving mode to the power-saving temporary mode.

Figure 8:
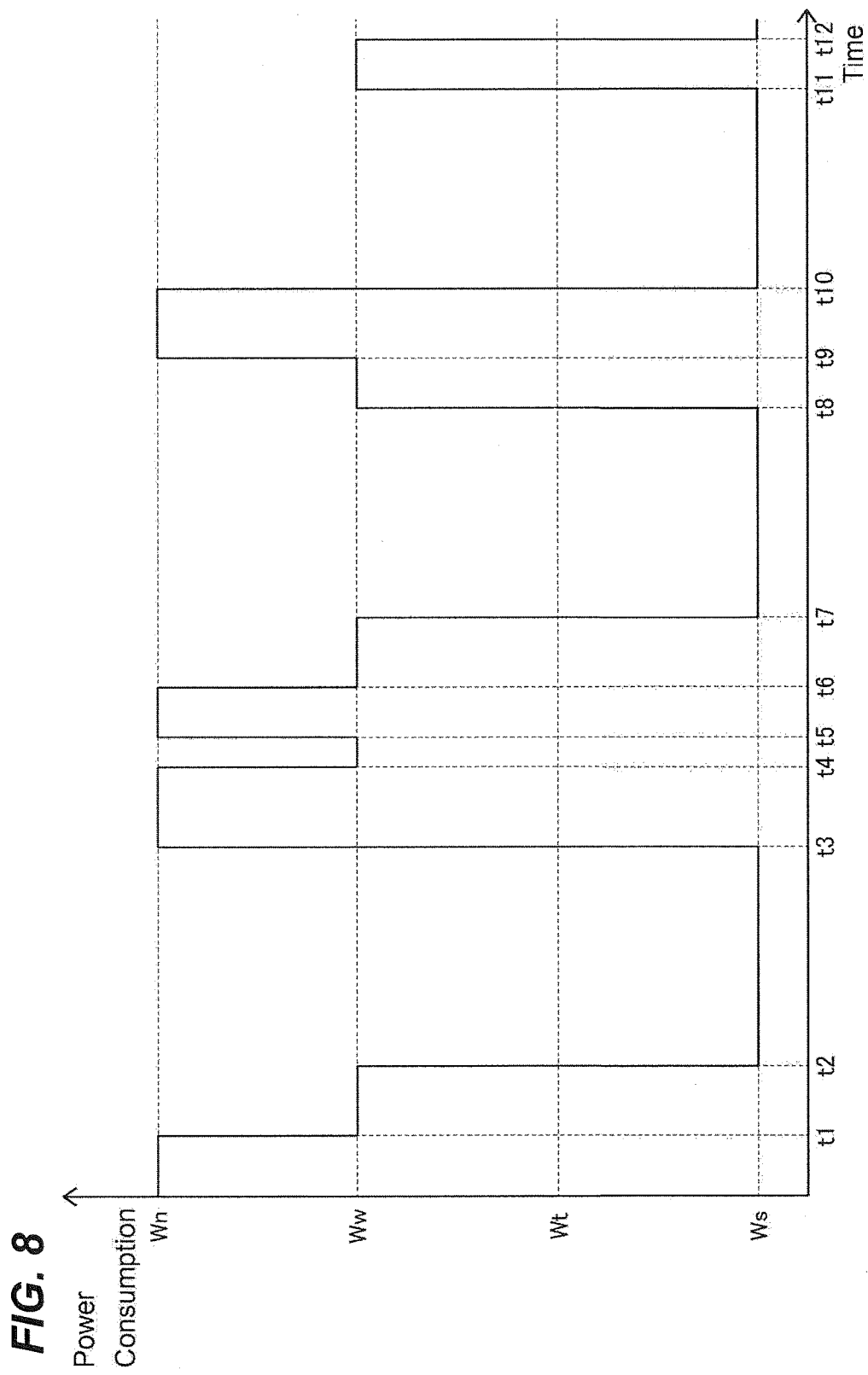
FIG. 8 illustrates an exemplary time change of power consumption of the MFP according to the embodiment.

FIG. 8 illustrates an exemplary time change of the power consumption of the MFP 10.

In FIG. 8, Wn is power consumption in the normal mode. Ww is power consumption in the weak power-saving mode. Ws is power consumption in the strong power-saving mode.

As illustrated in FIG. 8, the power mode switching unit 30a can switch from the normal mode to the weak power-saving mode (for example, t1, t4, or t6). For example, the power mode switching unit 30a switches to the weak power-saving mode when there is no operation to parts except for a button (hereinafter, referred to as a "Sleep button") for transferring into the weak power-saving mode and a button (hereinafter referred to as a "Deep Sleep button") for transferring into the strong power-saving mode at the operation unit 11, received data of the fax via the fax communication unit 16, and specific received data such as print data via the wired communication unit 17, the wireless communication unit 18, or the USB communication unit 19 for equal to or more than a specific period in the normal mode. The power mode switching unit 30a switches to the weak power-saving mode also when there is operation to the "Sleep button" in the normal mode.

The MFP 10 can execute a basic response of the network by the CPU 31 of the main controller 30 in the weak power-saving mode, thus ensuring a guarantee of network connectivity. The MFP 10 cannot execute operations that use the devices where the electric power is not supplied, such as print by the printer 13 based on the received data, but can execute operations that do not use the devices where the electric power is not supplied, such as reply of the state of the MFP 10 according to the received data, in the weak power-saving mode.

The power mode switching unit 30a can switch from the weak power-saving mode to the strong power-saving mode (for example, t2, t7, or t12). For example, the power mode switching unit 30a switches to the strong power-saving mode when there is no operation to the parts except for the "Sleep button" and the "Deep Sleep button" at the operation unit 11, the received data of the fax via the fax communication unit 16, the specific received data such as the print data via the wired communication unit 17, the wireless communication unit 18, or the USB communication unit 19 for more than a specific period in the weak power-saving mode. The power mode switching unit 30a switches to the strong power-saving mode also when there is operation to the "Deep Sleep button" in the weak power-saving mode.

The power mode switching unit 30a can switch from the normal mode to the strong power-saving mode via the weak power-saving mode in a sequence of operations (for example, t10). For example, the power mode switching unit 30a switches to the strong power-saving mode via the weak power-saving mode in the sequence of operations when there is the operation to the "Deep Sleep button" in the normal mode.

The MFP 10 can execute the basic response of the network by the sub controller 40 even in the strong power-saving mode, thus ensuring the guarantee of the network connectivity.

The power mode switching unit 30a can switch from the strong power-saving mode to the weak power-saving mode (for example, t8 or t11). For example, in the strong power-saving mode, when an interrupt indicating that there is an operation via the operation unit 11 enters, the electric power supply control ASIC 35 supplies the electric power to the core 31a of the CPU 31, the ROM 32, and the DRAM 33, thus the power mode switching unit 30a ensured by the CPU 31 switches to the weak power-saving mode. In the strong power-saving mode, when an interrupt indicating that there is the received data of the fax via the fax communication unit 16 enters, the electric power supply control ASIC 35 supplies the electric power to the core 31a of the CPU 31, the ROM 32, and the DRAM 33, thus the power mode switching unit 30a ensured by the CPU 31 switches to the weak power-saving mode. In the strong power-saving mode, when an interrupt indicating that there is the specific received data such as the print data via the wired communication unit 17 enters, the electric power supply control ASIC 35 supplies the electric power to the core 31a of the CPU 31, the ROM 32, and the DRAM 33, thus the power mode switching unit 30a ensured by the CPU 31 switches to the weak power-saving mode. In the strong power-saving mode, when an interrupt indicating that there is the specific received data such as the print data via the wireless communication enters from the interrupt detector 18a, the electric power supply control ASIC 35 supplies the electric power to the core 31a of the CPU 31, the ROM 32, and the DRAM 33, thus the power mode switching unit 30a ensured by the CPU 31 switches to the weak power-saving mode. In the strong power-saving mode, when an interrupt indicating that there is the specific received data such as the print data via the USB enters from the interrupt detector 19a, the electric power supply control ASIC 35 supplies the electric power to the core 31a of the CPU 31, the ROM 32, and the DRAM 33, thus the power mode switching unit 30a ensured by the CPU 31 switches to the weak power-saving mode. When the sub controller 40 receives specific received data to be processed by the main controller 30 via the wired communication unit 17 in the strong power-saving mode, the sub controller 40 can cause the storage unit 20 to store the received data as the received data 20b to pass the received data 20b to the main controller 30 via the storage unit 20. However, in the configuration that employs the single-core CPU, the core 31a of the CPU 31 can be substituted to the CPU for applying.

The MFP 10, in the strong power-saving mode, when the received data is not data that the sub controller 40 cannot process, switches from the strong power-saving mode to the weak power-saving mode to recover the CPU 31, the ROM 32, and the DRAM 33 of the main controller 30. The MFP 10 responds with the CPU 31 after the recovery, thus ensuring the maintained network connectivity.

The power mode switching unit 30a further switches from the weak power-saving mode to the normal mode when a cause switching from the strong power-saving mode to the weak power-saving mode is any of that there is the operation via the operation unit 11, that there is the received data of the fax via the fax communication unit 16, and that there is the specific received data such as the print data via the wired communication unit 17, the wireless communication unit 18, or the USB communication unit 19, that is, when the cause cannot be handled in the weak power-saving mode (for example, t3).

On the other hand, the power mode switching unit 30*a* does not further switch from the weak power-saving mode to the normal mode when the cause switching from the strong power-saving mode to the weak power-saving mode is, for example, any of a case where the specific input via the USB occurs and a case where the specific input via the wireless communication occurs, that is, when the cause can be handled in the weak power-saving mode.

The power mode switching unit 30*a* can switch from the weak power-saving mode to the normal mode (for example, t5 or t9). For example, the power mode switching unit 30*a* switches to the normal mode when the interrupt indicating that there is the operation via the operation unit 11 enters in the weak power-saving mode. The power mode switching unit 30*a* switches to the normal mode when the interrupt indicating that there is the received data of the fax via the fax communication unit 16 enters in the weak power-saving mode. The power mode switching unit 30*a* switches to the normal mode when the interrupt indicating that there is the specific received data such as the print data via the wired communication unit 17, the wireless communication unit 18, or the USB communication unit 19 enters in the weak power-saving mode.

The power consumption in the strong power-saving mode is mainly Ws as illustrated in FIG. 8. However, the power consumption in the strong power-saving mode is not constantly Ws in practice since temporal supply of the electric power to the CPU 31, the ROM 32, and the DRAM 33 of the main controller 30 is intermittently repeated in the strong power-saving mode.

Figure 9:
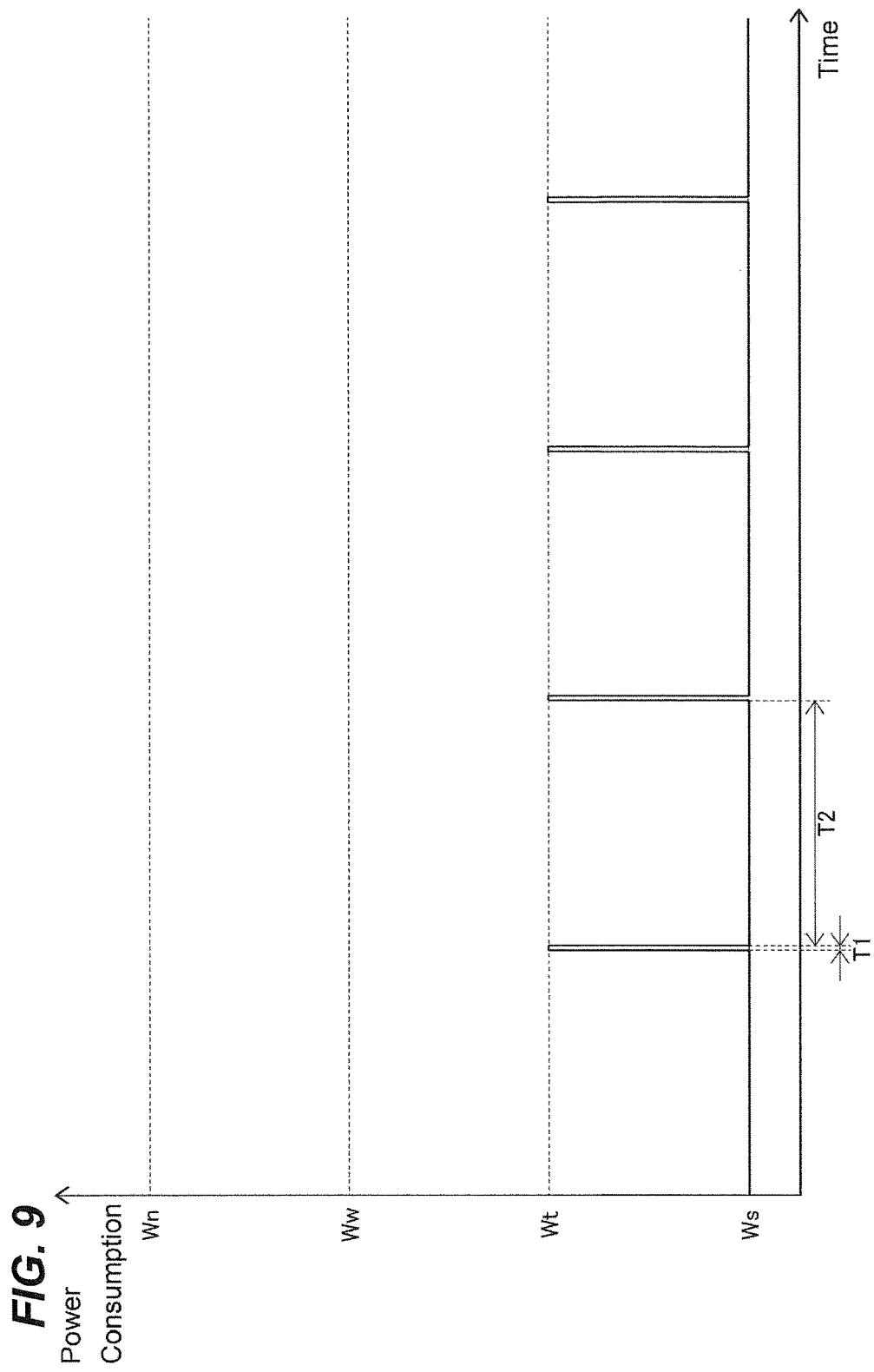
FIG. 9 illustrates an exemplary time change of power consumption of the MFP according to the embodiment in a power-saving state.

FIG. 9 illustrates an exemplary time change of the power consumption of the MFP 10 in a power-saving state.

In FIG. 9, Wt is power consumption in the power-saving temporary mode.

The power mode switching unit 30*a* can switch from the strong power-saving mode to the power-saving temporary mode. For example, in the strong power-saving mode, when a specific timing arrives, that is, when an interrupt indicating execution of the timer process enters, the electric power supply control ASIC 35 supplies the electric power to the core 31*a* of the CPU 31, the ROM 32, and the DRAM 33, thus the power mode switching unit 30*a* ensured by the CPU 31 switches to the power-saving temporary mode. When the sub controller 40 receives the specific received data to be processed by the main controller 30 via the wired communication unit 17 in the strong power-saving mode, the sub controller 40 can cause the storage unit 20 to store the received data as the received data 20*b* to pass the received data 20*b* to the main controller 30 after switching to the power-saving temporary mode via the storage unit 20.

The power mode switching unit 30*a* can switch from the power-saving temporary mode to the strong power-saving mode. For example, the power mode switching unit 30*a* switches to the strong power-saving mode when the timer process has terminated in the power-saving temporary mode.

As described above, the power mode switching unit 30*a* intermittently repeats the switch to the power-saving temporary mode, in the strong power-saving mode. Here, a time interval T1 from a start to an end of the switch to the power-saving temporary mode is usually extremely shorter than a time interval T2 from an end of the power-saving temporary mode to a start of the next power-saving temporary mode. For example, the time interval T1 is about 100 to 200 milliseconds, and the time interval T2 is often about 3 to 30 seconds.

The power mode switching unit 30*a* can switch from the power-saving temporary mode to the weak power-saving mode (Step S107). For example, the power mode switching unit 30*a* switches to the weak power-saving mode when the interrupt indicating that there is the operation via the operation unit 11 enters in the power-saving temporary mode. The power mode switching unit 30*a* switches to the weak power-saving mode when the interrupt indicating that there is the received data of the fax via the fax communication unit 16 enters in the power-saving temporary mode. The power mode switching unit 30*a* switches to the weak power-saving mode when the interrupt indicating that there is the specific received data such as the print data via the wired communication unit 17 enters in the power-saving temporary mode. The power mode switching unit 30*a* switches to the weak power-saving mode when the interrupt indicating that there is the specific received data such as the print data via the wireless communication enters from the interrupt detector 18*a* in the power-saving temporary mode. The power mode switching unit 30*a* switches to the weak power-saving mode when the interrupt indicating that there is the specific received data such as the print data via the USB enters from the interrupt detector 19*a* in the power-saving temporary mode. That is, the power mode switching unit 30*a* switches to the weak power-saving mode when the interrupt except for the interrupt indicating the execution of the timer process centers in the power-saving temporary mode.

The power mode switching unit 30*a* further switches from the weak power-saving mode to the normal mode when a cause switching from the power-saving temporary mode to the weak power-saving mode is any of that there is the operation via the operation unit 11, that there is the received data of the fax via the fax communication unit 16, and that there is the specific received data such as the print data via the wired communication unit 17, the wireless communication unit 18, or the USB communication unit 19, that is, when the cause cannot be handled in the weak power-saving mode (Step S102).

On the other hand, the power mode switching unit 30*a* does not further switch from the weak power-saving mode to the normal mode when the cause switching from the power-saving temporary mode to the weak power-saving mode is, for example, any of a case where the specific input via the USB occurs and a case where the specific input via the wireless communication occurs, that is, when the cause can be handled in the weak power-saving mode. However, the power mode switching unit 30*a* switches from the weak power-saving mode to the normal mode when the interrupt that cannot be handled by the weak power-saving mode occurs in the weak power-saving mode.

Figure 10:
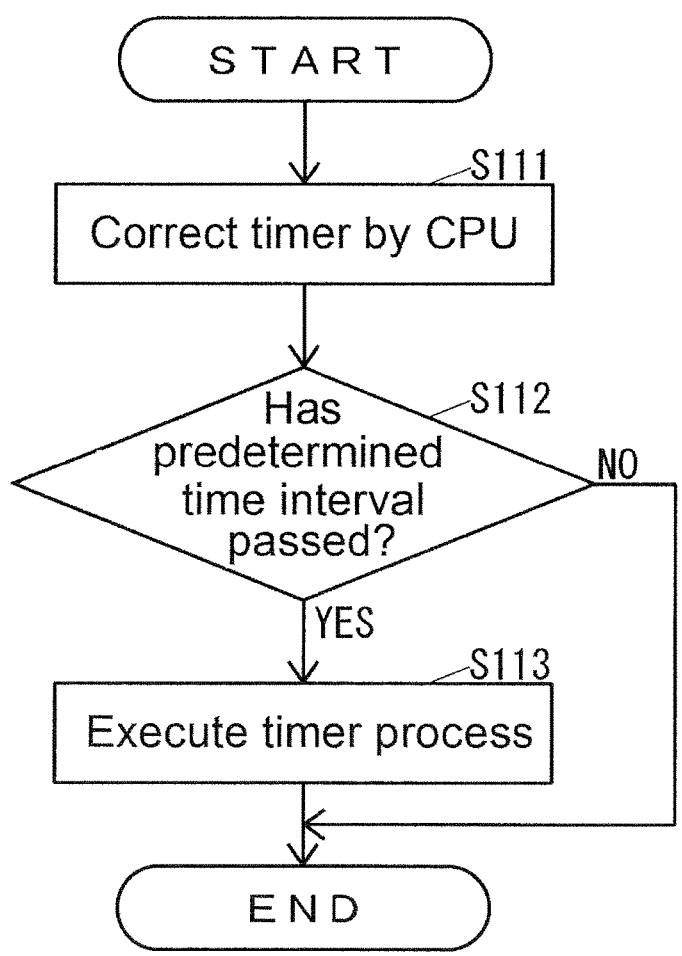
FIG. 10 illustrates an operation of a timer processing unit according to the embodiment in the power-saving temporary mode.

FIG. 10 illustrates an operation of the timer processing unit 30*b* in the power-saving temporary mode.

As illustrated in FIG. 10, the timer processing unit 30*b* corrects a timer by the CPU 31 of the main controller 30 by a real-time clock (not illustrated) (Step S111).

Next, the timer processing unit 30*b* determines whether a time interval indicated by the timer process interval 20*c* has passed from the previous execution of the timer process or not based on the timer by the CPU 31 (Step S112).

When the timer processing unit 30*b* determines that the time interval has passed at Step S112, the timer processing unit 30*b* executes the timer process (Step S113) to terminate the operation illustrated in FIG. 10. On the other hand, when the timer processing unit 30*b* determines that the time interval has not passed at Step S112, the timer processing unit 30b terminates the operation illustrated in FIG. 10 without executing the timer process.

The timer processing unit 30b repeats the processes at Steps S112 and S113 for each kind of the timer process.

For example, the timer processing unit 30b requests the lease period update of the IP address of the MFP 10 from the DHCP server at the time interval indicated by the timer process interval 20c in a case, such as a lapse of a half of the lease period of the IP address of the MFP 10.

The timer processing unit 30b transmits the report mail at the time interval indicated by the timer process interval 20c, for example, per minute.

As described above, the MFP 10 reduces the power consumption of the CPU 31, which functions as the power mode switching unit 30a that switches the power modes of the MFP 10, in the power-saving temporary mode compared with in the weak power-saving mode to ensure the reduced power consumption, and increases the power consumption of the CPU 31, which functions as the power mode switching unit 30a, in the weak power-saving mode compared with in the power-saving temporary mode to ensure the high speed switch from the strong power-saving mode or the power-saving temporary mode to the weak power-saving mode.

When a specific condition is satisfied in the power-saving temporary mode, which is temporarily switched in the strong power-saving mode, the MFP 10 does not switch to the weak power-saving mode after returning to the strong power-saving mode, but switches to the weak power-saving mode without returning to the strong power-saving mode (Step S107), thus ensuring improvement of switching speed from the power-saving temporary mode to the weak power-saving mode.

According to the embodiment, the power mode switching unit 30a is ensured by the CPU 31 as the quad-core CPU that mounts four processor cores within one processor package. However, the number of the cores of the CPU that ensures the power mode switching unit 30a is not limited to four.

The MFP 10 ensures the power mode switching unit 30a by the CPU 31 as one multi-core CPU that mounts a plurality of processor cores within one processor package, thus ensuring the reduced power consumption compare with a configuration where a plurality of CPUs ensure the power mode switching unit 30a. However, the power mode switching unit 30a may be ensured by the plurality of CPUs.

According to the embodiment, the electric power is supplied to one core among the plurality of cores of the CPU 31 in the power-saving temporary mode. However, the electric power may be supplied to a plurality of and a part of cores.

The disclosure is also applicable to the single-core CPU as described above. In this case, the MFP 10 also ensures the reduced power consumption of at least a part of devices where the electric power is supplied in the weak power-saving mode switched when the specific condition is satisfied in the strong power-saving mode, in the power-saving temporary mode, which is temporarily switched in the strong power-saving mode. This ensures the reduced power consumption in the power-saving temporary mode, which temporarily supplies the electric power to specific devices, that is, the CPU 31, the ROM 32, and the DRAM 33 of the main controller 30 in power-saving state.

Specifically, the MFP 10 reduces the power consumption of the USB communication unit 19 where the electric power is supplied in the weak power-saving mode, which is switched when the specific input via the USB occurs in the strong power-saving mode, in the power-saving temporary mode, thus ensuring the reduced power consumption in the power-saving temporary mode.

The MFP 10 reduces the power consumption of the wireless communication unit 18 where the electric power is supplied in the weak power-saving mode, which is switched when the specific input via the wireless communication occurs in the strong power-saving mode, in the power-saving temporary mode, thus ensuring the reduction of power consumption in the power-saving temporary mode.

As described above, the MFP 10 reduces power consumption of unnecessary devices that are not used in the power-saving temporary mode compared with in the weak power-saving mode, thus ensuring the reduced power consumption in the power-saving temporary mode. Effect of the reduced power consumption in the power-saving temporary mode can not only be obtained by suppression of the power consumption of the unnecessary devices that are not used in the power-saving temporary mode, but also can be obtained by suppression of reduction of time in the strong power-saving mode by time of the processes such as supplying the electric power to the unnecessary devices that are not used in the power-saving temporary mode and halting the supply of the electric power.

According to the embodiment, the wireless communication unit 18 and the USB communication unit 19 are exemplified as the unnecessary devices that are not used in the power-saving temporary mode. However, the unnecessary devices may be devices other than these devices.

When the specific condition is satisfied in the power-saving temporary mode, which is temporarily switched in the strong power-saving mode, the MFP 10 does not switch to the weak power-saving mode after returning to the strong power-saving mode, but switches to the weak power-saving mode without returning to the strong power-saving mode (Step S107), thus ensuring the improvement of the switching speed from the power-saving temporary mode to the weak power-saving mode.

The electronic device of the disclosure is an MFP according to the embodiment. However, the electronic device of the disclosure may be an image forming apparatus such as a printer-only machine, a copy-only machine, a FAX-only machine, and a scanner-only machine, other than the MFP, and may be an electronic device such as a personal computer (PC), other than the image forming apparatus.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electronic device comprising
a hardware element that includes a power mode switching unit that switches power modes of the electronic device,
wherein the power mode includes:
a normal mode;
a weak power-saving mode whose power consumption is lower than a power consumption of the normal mode and which enables the electronic device to respond to a specific input;
a strong power-saving mode whose power consumption is lower than the power consumption of the weak power-saving mode and which causes the electronic device to be unable to respond to the specific input; and a power-saving temporary mode that is temporarily switched every time a specific timing arrives while a condition in which the specific input occurs is unsatisfied in the strong power-saving mode and which causes the electronic device to be unable to respond to the specific input, the power-saving temporary mode has a power consumption lower than the power consumption of the weak power-saving mode due to a reduced power consumption of at least a part of the hardware element in the power-saving temporary mode compared with the power consumption in the weak power-saving mode, the power consumption of the strong power-saving mode is lower than the power consumption of the power-saving temporary mode due to a reduced power consumption of at least a part of the hardware element in the strong power-saving mode compared with the power consumption in the power-saving temporary mode, the power mode switching unit switches to the weak power-saving mode when the condition in which the specific input occurs becomes satisfied in the strong power-saving mode, and the power mode switching unit switches to the weak power-saving mode without returning to the strong power-saving mode when the condition in which the specific input occurs becomes satisfied in the power-saving temporary mode.

2. The electronic device according to claim 1, wherein the hardware element includes at least one CPU.

3. The electronic device according to claim 2, wherein the at least one CPU that functions as the power mode switching unit is one CPU including a plurality of cores, an electric power is supplied to all the plurality of cores in the weak power-saving mode, no electric power is supplied to any of the plurality of cores in the strong power-saving mode, and an electric power is supplied to only one core among the plurality of cores in the power-saving temporary mode.

4. The electronic device according to claim 1, wherein the hardware element includes a plurality of devices.

5. The electronic device according to claim 4, further comprising a USB response device that responds to the specific input via a USB as one of the devices, the weak power-saving mode enables the USB response device to respond to the specific input, and the power-saving temporary mode and the strong power-saving mode reduces a power consumption of the USB response device compared with the power consumption in the weak power-saving mode so as to cause the USB response device unable to respond to the specific input.

6. The electronic device according to claim 4, further comprising a wireless response device that responds to the specific input via wireless communication as one of the devices, the weak power-saving mode enables the wireless response device to respond to the specific input, and the power-saving temporary mode and the strong power-saving mode reduces a power consumption of the wireless response device compared with the power consumption in the weak power-saving mode so as to cause the wireless response device unable to respond to the specific input.

7. A non-transitory computer-readable recording medium that stores a power control program for controlling an electronic device including a hardware element with a power mode switching unit, wherein the power control program causes the electronic device to function as the power mode switching unit that switches power modes of the electronic device, the power mode includes:
  a normal mode;
  a weak power-saving mode whose power consumption is lower than a power consumption of the normal mode and which enables the electronic device to respond to a specific input;
  a strong power-saving mode whose power consumption is lower than the power consumption of the weak power-saving mode and which causes the electronic device to be unable to respond to the specific input; and
  a power-saving temporary mode that is temporarily switched every time a specific timing arrives while a condition in which the specific input occurs is unsatisfied in the strong power-saving mode and which causes the electronic device to be unable to respond to the specific input, the power-saving temporary mode has a power consumption lower than the power consumption of the weak power-saving mode due to a reduced power consumption of at least a part of the hardware element in the power-saving temporary mode compared with the power consumption in the weak power-saving mode, the power consumption of the strong power-saving mode is lower than the power consumption of the power-saving temporary mode due to a reduced power consumption of at least a part of the hardware element in the strong power-saving mode compared with the power consumption in the power-saving temporary mode, the power mode switching unit switches to the weak power-saving mode when the condition becomes satisfied in the strong power-saving mode, and the power mode switching unit switches to the weak power-saving mode without returning to the strong power-saving mode when the condition in which the specific input occurs becomes satisfied in the power-saving temporary mode.

* * * * *